United States Patent
Heo

(10) Patent No.: US 9,121,498 B2
(45) Date of Patent: Sep. 1, 2015

(54) DAMPER CLUTCH CONTROL APPARATUS OF AUTOMATIC TRANSMISSION AND METHOD FOR THE SAME

(75) Inventor: Man Se Heo, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 422 days.

(21) Appl. No.: 13/535,065

(22) Filed: Jun. 27, 2012

(65) Prior Publication Data
US 2013/0150212 A1    Jun. 13, 2013

(30) Foreign Application Priority Data
Dec. 8, 2011    (KR) .......................... 10-2011-0131301

(51) Int. Cl.
  *B60W 10/02* (2006.01)
  *F16H 61/14* (2006.01)
  *F16H 59/18* (2006.01)
  *F16H 59/14* (2006.01)

(52) U.S. Cl.
  CPC .............. *F16H 61/143* (2013.01); *F16H 59/18* (2013.01); *F16H 2059/147* (2013.01); *F16H 2059/183* (2013.01); *Y10T 477/75* (2015.01)

(58) Field of Classification Search
  CPC . F16H 59/18; F16H 61/143; F16H 2059/147; F16H 2059/183; Y10T 477/75
  USPC ......................................... 477/169, 175, 180
  See application file for complete search history.

(56) References Cited

U.S. PATENT DOCUMENTS 7,530,924 B2 * 5/2009 Brevick ........................ 477/169

FOREIGN PATENT DOCUMENTS

| JP | 2002-206636 A | 7/2002 |
| JP | 2010-209942 A | 9/2010 |
| KR | 100285456 B1 | 1/2001 |
| KR | 10-2006-0001073 A | 1/2006 |
| KR | 10-0836915 B1 | 6/2008 |

* cited by examiner

Primary Examiner — Jacob S Scott
(74) Attorney, Agent, or Firm — Morgan, Lewis & Bockius LLP

(57) ABSTRACT

A damper clutch control apparatus for an automatic transmission may include a driving information detection unit detecting driving information including a displacement amount of an accelerator pedal, an engine speed, an engine torque, and a rotation speed of a turbine, a control portion which receives the driving information and realize a release control of a damper clutch when a driver's intention for acceleration or deceleration of a vehicle may be detected in a state of connection of the damper clutch, and an actuator which controls hydraulic pressure supplied to the damper clutch so as to realize connection or release of the damper clutch according to a control signal received from the control portion.

13 Claims, 9 Drawing Sheets

DAMPER CLUTCH CONTROL APPARATUS OF AUTOMATIC TRANSMISSION AND METHOD FOR THE SAME

CROSS-REFERENCE TO RELATED APPLICATION

The present application claims priority to Korean Patent Application No. 10-2011-0131301 filed in the Korean Intellectual Property Office on Dec. 8, 2011, the entire contents of which is incorporated herein for all purposes by this reference.

BACKGROUND OF THE INVENTION

1. Field of the Invention

The present invention relates to an automatic transmission. More particularly, the present invention relates to a damper clutch control apparatus of an automatic transmission and a method for the same which may realize active release of a damper clutch.

2. Description of Related Art

As drivers have wanted a vehicle convenient for driving, automatic transmissions have been widely used. However, an automatic transmission uses a torque converter of low efficiency, and thus, compared with a manual transmission, it has a critical drawback in fuel consumption.

Accordingly, in order to simultaneously provide the convenience of the automatic transmission and the efficiency of the manual transmission, a damper clutch that directly connects a pump axis of a torque converter with a turbine in a predetermined driving condition has been provided.

The damper clutch directly connects or releases the pump axis and the turbine so as to prevent deterioration of the fuel consumption due to a power loss that is generated by a rotation-speed difference between the pump axis and the turbine axis above a predetermined vehicle speed.

An automatic transmission is provided with a predetermined map of which operation condition and disoperation condition of a damper clutch is stored and the operation condition and the disoperation condition of a damper clutch is determined according to input torque (engine torque value*torque ratio of a torque converter) and slip amount, which are calculated based on a throttle opening, turbine speed, engine speed and vehicle speed.

If the operation condition of a damper clutch is damper clutch is satisfied, a solenoid for the damper clutch is operated to operate the damper clutch and thus efficiency of a manual transmission and convenience of an automatic transmission may be realized.

For determining the map for controlling the damper clutch of the automatic transmission, a damper clutch release line of transient state for engaging and disengaging is determined opening amount of a throttle valve. And in a low speed, the damper clutch release line is determined relatively low due to booming.

The booming means a vibration noise which is generated according to increasing of turbine speed change rate in engagement of the damper clutch.

In a conventional art, when the damper clutch is connected, fuel consumption may be enhanced. However, a driver's intention for acceleration may not be in reflected.

Also, if the disengagement condition of a damper clutch is damper clutch is satisfied, the connection of the damper clutch is release immediately, and thus vehicle's deviation and various load conditions are not in reflected, acceleration may not be satisfied, and shock may be occurred.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a damper clutch control apparatus of an automatic transmission and a method for the same which may realize active release of a damper clutch, reduce shock and enhance response characteristic.

A damper clutch control apparatus for an automatic transmission according to an exemplary embodiment of the present invention may include a driving information detection unit detecting driving information including displacement amount of an accelerator pedal, engine speed, engine torque, and turbine speed, a control portion which realize release control of a damper clutch when a driver's intention for acceleration or deceleration of a vehicle is detected in a state of connection of the damper clutch and an actuator which controls hydraulic pressure supplied to damper clutch so as to realize connection or release of the damper clutch according to control signal received from the control portion.

The driving information detection unit may include an accelerator pedal position detector detecting a position of an accelerator pedal and supplying corresponding signal to the control portion, an engine speed detector detecting engine speed and supplying corresponding signal to the control portion, an engine torque detector detecting output torque of an engine and supplying corresponding signal to the control portion and a turbine rotation speed detector detecting rotation speed of a turbine and supplying corresponding signal to the control portion.

The control portion may determine that there is a driver's intention of acceleration if the displacement amount of an accelerator pedal is changed over 20%, or the accelerator pedal changing rate is 100%/sec at a state of engagement of the damper clutch and in power on driving, and the control portion may immediately conduct release control of the damper clutch.

The control portion may determine whether driving condition is changed to disengagement condition of the damper clutch according to a map data at a state of engagement of the damper clutch and in power on driving, and the control portion may determine duty offset and duty slope for damper clutch release control and conducts release control of the damper clutch according to the determined duty offset and the duty slope when the driving condition is changed to the disengagement condition of the damper clutch.

The control portion may determine the duty offset for the damper clutch release control based on the engine torque, and the control portion may determine the duty slop for the damper clutch release control based on slip amount of the engine speed and the turbine speed.

The control portion may be provided with a predetermined map data including the duty offset for the damper clutch release control based on the engine torque, and the duty slop for the damper clutch release control based on slip amount of the engine speed and the turbine speed.

The control portion may determine whether driving condition is changed to disengagement condition of the damper clutch according to a map data at a state of engagement of the damper clutch and in power off driving, and the control portion may determine duty offset and duty slope for damper clutch release control and conducts release control of the damper clutch according to the determined duty offset and the duty slope when the driving condition is changed to the disengagement condition of the damper clutch.

The control portion may determine the duty offset for the damper clutch release control based on the engine torque, and the control portion may determine the duty slope for the damper clutch release control based on slip amount of the engine speed and the turbine speed.

The control portion may be provided with a predetermined map data including the duty offset for the damper clutch release control based on the engine torque, and the duty slope for the damper clutch release control based on slip amount of the engine speed and the turbine speed.

If the control portion detects power off at a state of engagement of the damper clutch and in power on driving, the control portion may determine duty holding time, duty offset and duty slope for damper clutch release control and conducts release control of the damper clutch according to the duty holding time, the determined duty offset and the duty slope.

The control portion may determine the duty offset for the damper clutch release control based on the engine torque, and the control portion may determine the duty slope for the damper clutch release control based on slip amount of the engine speed and the turbine speed.

The control portion may determine the duty holding time for the damper clutch release control based on slip amount of the engine speed and the turbine speed.

The control portion may be provided with a predetermined map data including the duty offset for the damper clutch release control based on the engine torque, the duty slope for the damper clutch release control based on slip amount of the engine speed and the turbine speed, and the duty holding time for the damper clutch release control based on slip amount of the engine speed and the turbine speed.

The control portion may determine that it is power off (driver's intention of deceleration) if the displacement amount of an accelerator pedal is detected lower than 1%, or the turbine speed change is less than −2500 RPM/sec.

A damper clutch control method for an automatic transmission according to an exemplary embodiment of the present invention may include releasing immediately if a driver's intention of acceleration is detected at a state of engagement of the damper clutch and in power on driving, determining duty offset and duty slope for damper clutch release control and conducting the release control of the damper clutch according to the determined duty offset and the duty slope if driving condition is changed to disengagement condition of the damper clutch according to a map data at a state of engagement of the damper clutch and in power on driving, determining duty offset and duty slope for damper clutch release control and conducting the release control of the damper clutch according to the determined duty offset and the duty slope if driving condition is changed to disengagement condition of the damper clutch according to a map data at a state of engagement of the damper clutch and in power off driving, and determining duty holding time, duty offset and duty slope for damper clutch release control and conducting the release control of the damper clutch according to the duty holding time, the determined duty offset and the duty slope if power off is detected at a state of engagement of the damper clutch and in power on driving.

The duty offset for the damper clutch release control may be determined based on the engine torque, and the duty slope for the damper clutch release control may be determined based on slip amount of the engine speed and the turbine speed.

The duty holding time for the damper clutch release control may be determined based on slip amount of the engine speed and the turbine speed.

If the displacement amount of an accelerator pedal is changed over 20%, or the accelerator pedal changing rate is 100%/sec at a state of engagement of the damper clutch and in power on driving, it may be determined that there is a driver's intention of acceleration and the damper clutch may be immediately released.

It may be determined of power off (driver's intention of deceleration) if the displacement amount of an accelerator pedal is detected lower than 1%, or the turbine speed change is less than −2500 RPM/sec, it is determined that it is determined that there is a driver's intention of deceleration.

The damper clutch control apparatus and the method for the same according to an exemplary embodiment of the present invention may realize active release of a damper clutch and enhance response characteristic reflecting a driver's intention of acceleration or deceleration.

Also, the damper clutch control apparatus and the method for the same according to an exemplary embodiment of the present invention may reduce shock of releasing the damper clutch according to various driving conditions.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
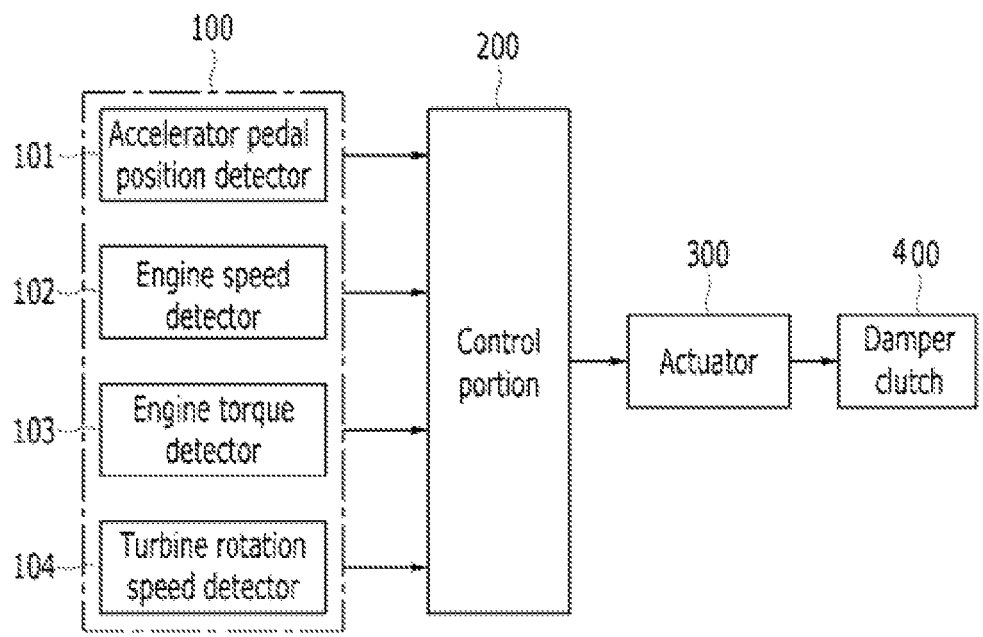
FIG. 1 is a drawing showing a damper clutch control apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, size and thickness of components shown in the drawings may be differ from real size and real thickness of the components for better comprehension and ease of description. Therefore, the present invention is not limited to those shown in the drawings.

FIG. 1 is a drawing showing a damper clutch control apparatus according to an exemplary embodiment of the present invention.

Referring to FIG. 1, showing a damper clutch control apparatus according to an exemplary embodiment of the present invention includes a driving information detection unit 100, a control portion 200 and an actuator 300.

The driving information detection unit 100 detects displacement amount of an accelerator pedal which is driven by a driver, engine speed, engine torque, and turbine speed and supplies the information corresponding signal to the control portion 200.

The driving information detection unit 100 includes an accelerator pedal position detector 101, an engine speed detector 102, an engine torque detector 103 and a turbine rotation speed detector 104.

The accelerator pedal position detector 101 detects a position of an accelerator pedal and supplies corresponding signal to the control portion 200.

The engine speed detector 102 detects engine speed and supplies corresponding signal to the control portion 200.

The engine torque detector 103 detects output torque of an engine and supplies corresponding signal to the control portion 200.

The turbine rotation speed detector 104 detects rotation speed of a turbine and supplies corresponding signal to the control portion 200.

The control portion 200 analyzes information received from the driving information detection unit 100 at a state of engagement of the damper clutch 400, determines driver's intention of acceleration or deceleration, and then control portion 200 conducts release control of the damper clutch 400 actively according to driving condition when driver's intention of acceleration or deceleration is determined.

The control portion 200 determines that there is a driver's intention of the acceleration if the displacement amount of an accelerator pedal is changed over 20%, or the accelerator pedal changing rate is 100%/sec at a state of engagement of the damper clutch 400 and in power on driving, and immediately conducts the release control of the damper clutch 400.

In this case, the power on driving means a driving state where a driver pushes an accelerator pedal.

The control portion 200 determines whether driving condition is changed to disengagement condition of the damper clutch 400 according to a map data at a state of engagement of the damper clutch 400 and in power on driving. And then the control portion 200 determines duty offset and duty slope for damper clutch release control and conducts release control of the damper clutch 400 according to the determined duty offset and the duty slope when the driving condition is changed to the disengagement condition of the damper clutch 400.

The map data may be produced from experiments according to various driving conditions which may determine engagement or disengagement of the damper clutch 400, and it may be obvious to a person skilled in the art, and the detailed description will be omitted in the specification.

The duty offset mean a kind of preparation process for the damper clutch release control, and control duty value of the actuator 300 may be reduced according to the duty offset.

The duty slope mean a process of the damper clutch release control, and control duty value of the actuator 300 may be reduced at a predetermined rate.

The control portion 200 determines whether driving condition is changed to disengagement condition of the damper clutch 400 according to a map data at a state of engagement of the damper clutch 400 and in power off driving. And then the control portion 200 determines duty offset and duty slope for damper clutch release control and conducts release control of the damper clutch 400 according to the determined duty offset and the duty slope when the driving condition is changed to the disengagement condition of the damper clutch 400.

In this case, the power off driving means a driving state where a driver does not push an accelerator pedal.

For example, the control portion 200 determines the duty offset as 20% for the damper clutch release control if the engine torque is 50 Nm, and determines the duty offset as 30% if the engine torque is 100 Nm. Also, the control portion 200 determines the duty slope as −5% if the slip amount of the engine speed and the turbine speed is −50 RPM, and determines the duty slope as −3% if the slip amount of the engine speed and the turbine speed is −100 RPM, The duty offset and duty slope may be stored in the map data produced from experiments according to various driving conditions, and it may be obvious to a person skilled in the art, and the detailed description will be omitted in the specification.

If the control portion 200 detects power off at a state of engagement of the damper clutch 400 and in power on driving, the control portion 200 determines duty holding time, duty offset and duty slope for damper clutch release control and conducts release control of the damper clutch 400 according to the duty holding time, the determined duty offset and the duty slope.

The control portion 200 determines that it is power off (driver's intention of deceleration) if the displacement amount of an accelerator pedal is detected lower than 1%, or the turbine speed change is less than −2500 RPM/sec.

The control portion 200 determines the duty offset for the damper clutch release control based on the engine torque, the duty slope for the damper clutch release control based on slip amount of the engine speed and the turbine speed, and the duty holding time for the damper clutch release control based on slip amount of the engine speed and the turbine speed.

The duty holding means a process of maintaining current duty at a predetermined interval.

For example, if the slip amount of the engine speed and the turbine speed is 0 RPM, the duty holding time is set as "0" sec, and if the slip amount is −50 RPM, the duty holding time is set as 0.5 sec.

The duty offset for the damper clutch release control based on the engine torque, the duty slope for the damper clutch release control based on slip amount of the engine speed and the turbine speed, and the duty holding time for the damper clutch release control based on slip amount of the engine speed and the turbine speed are stored in the map data.

The actuator 300 may be a solenoid valve and controls hydraulic pressure supplied to the damper clutch 400 according to control signal received from the control portion 200 so as to realize the engagement or disengagement of the damper clutch 400.

Hereinafter, operations of the damper clutch 400 control apparatus for an automatic transmission according to exemplary embodiments of the present invention will be described.

Figure 3:
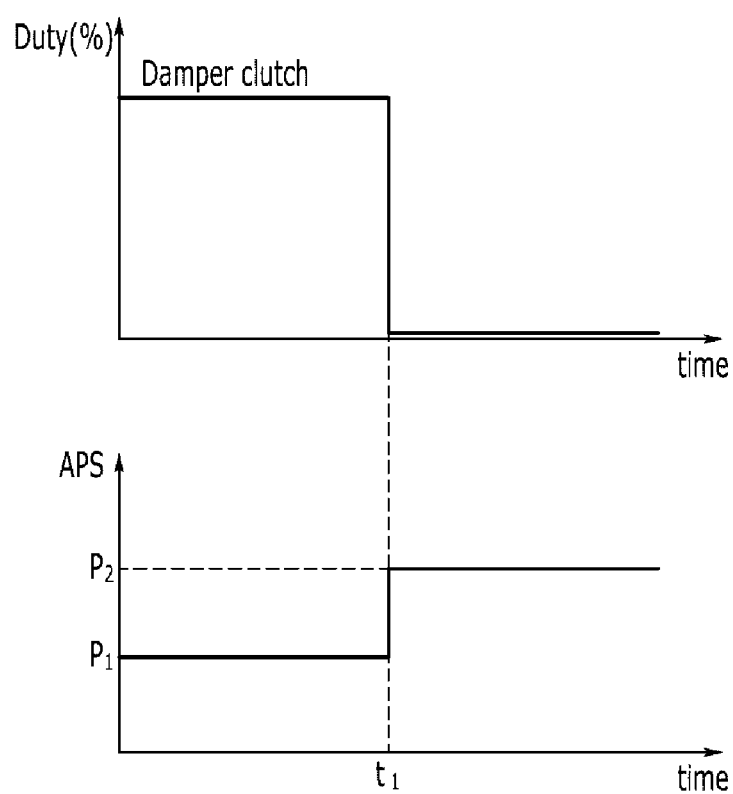
FIG. 3 is a graph showing a control relationship of a damper clutch control method according to the various exemplary embodiments of the present invention.
Figure 4:
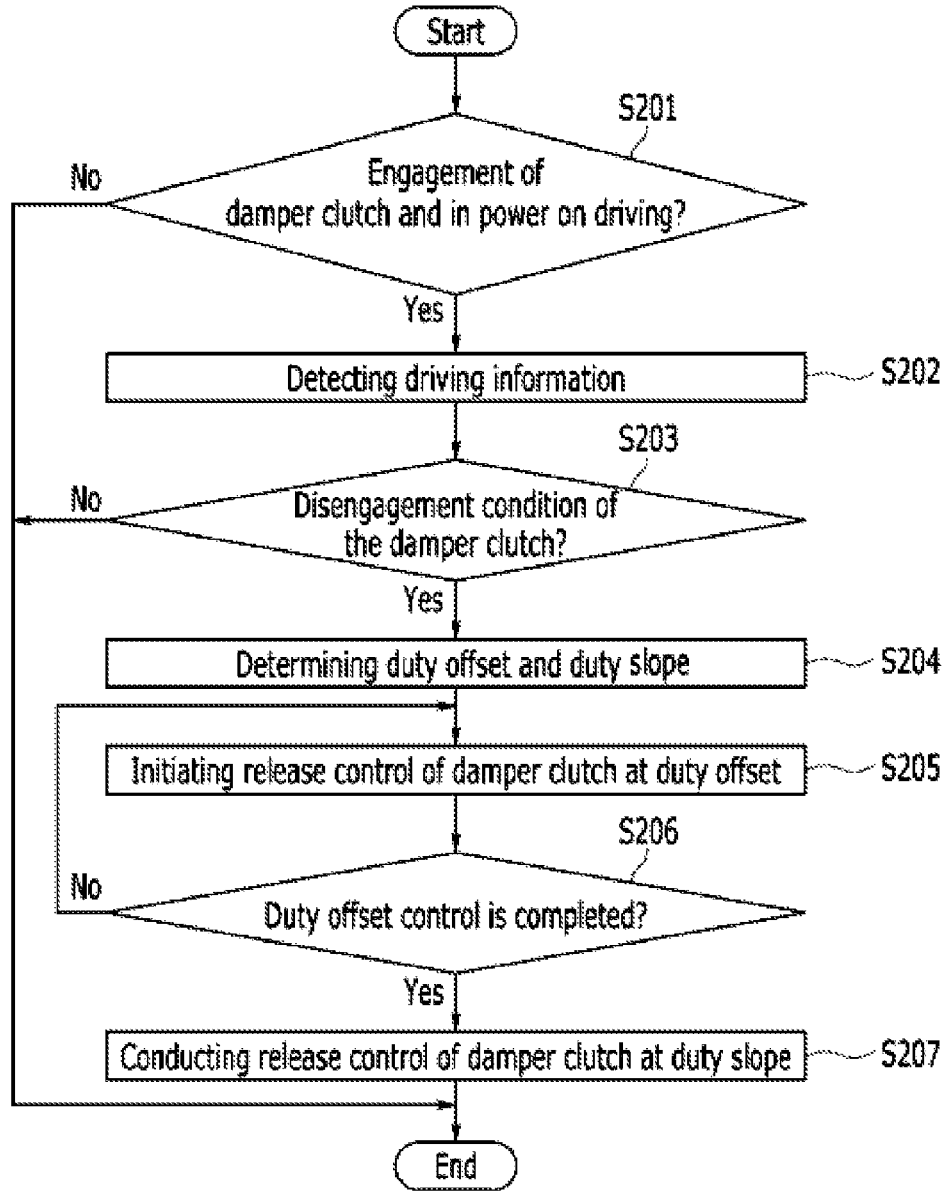
FIG. 4 is a flowchart of a damper clutch control method according to the various exemplary embodiments of the present invention.

FIG. 3 is a graph showing a control relationship of a damper clutch 400 control method according to the first exemplary embodiment of the present invention, and FIG. 4 is a flowchart of a damper clutch 400 control method according to the second exemplary embodiment of the present invention.

Figure 2:
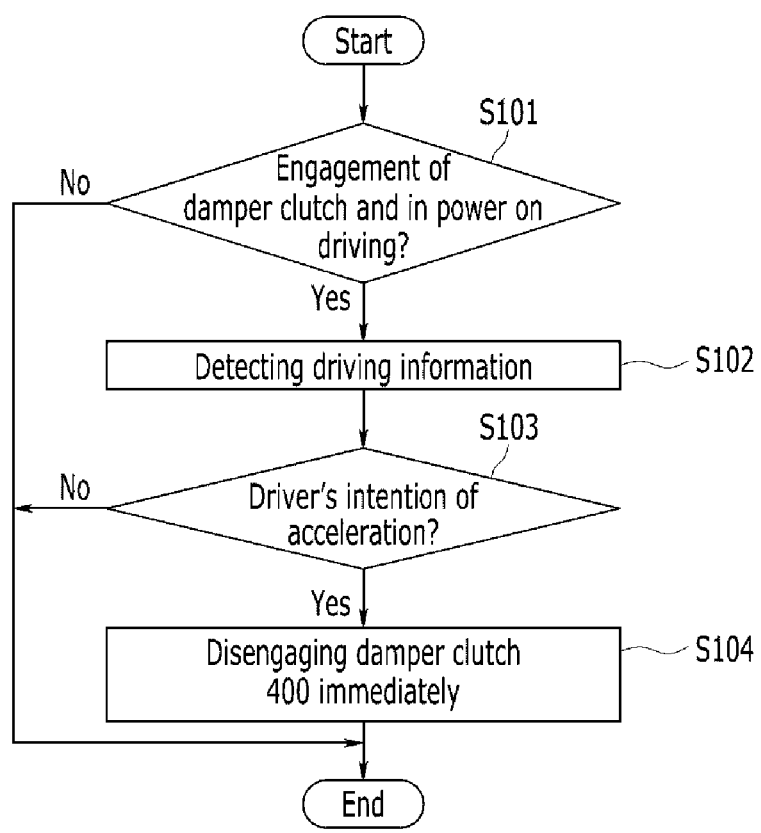
FIG. 2 is a flowchart of a damper clutch control method according to the various exemplary embodiments of the present invention.

Referring to FIG. 2 and FIG. 3, if it is in driving at a state of engagement of the damper clutch 400 and in power on driving at the step S101, the control portion 200 receives the driving information from the driving information detection unit 100 at the step S102, and determines whether a driver's intention of acceleration is detected at the step S103.

If the displacement amount of an accelerator pedal is changed over 20%, or the accelerator pedal changing rate is 100%/sec at the step the S103, the control portion 200 determines that there is a driver's intention of acceleration and then controls the actuator 300 to exhaust hydraulic pressure of the damper clutch 400 for the damper clutch 400 to be disengaged immediately.

According to the damper clutch control method according to the first exemplary embodiment of the present invention may realize rapid response of acceleration.

Figure 5:
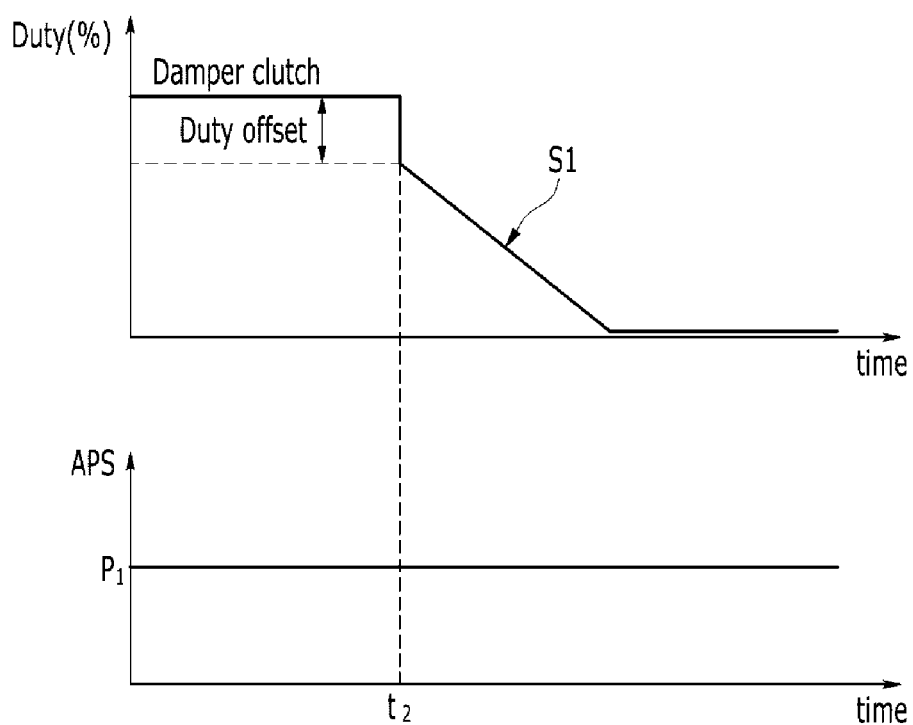
FIG. 5 is a graph showing a control relationship of a damper clutch control method according to the various exemplary embodiments of the present invention.

FIG. 4 is a flowchart of a damper clutch control method according to the second exemplary embodiment of the present invention, and FIG. 5 is a graph showing a control relationship of a damper clutch control method according to the second exemplary embodiment of the present invention.

Referring to FIG. 4 and FIG. 5, if it is in driving at a state of engagement of the damper clutch 400 and in power on driving at the step S201, the control portion 200 receives the driving information from the driving information detection unit 100 at the step S202, and determines whether driving condition is changed to disengagement condition of the damper clutch 400 according to the map data at the step S203.

If the driving condition is changed to disengagement condition of the damper clutch 400 at the step S203, the control portion 200 determines the duty offset for the damper clutch release control based on the engine torque, and the duty slope S1 for the damper clutch release control based on slip amount of the engine speed and the turbine speed at the step S204.

For example, the control portion 200 determines the duty offset as 20% for the damper clutch release control if the engine torque is 50 Nm, and determines the duty offset as 30% if the engine torque is 100 Nm. Also, the control portion 200 determines the duty slope as −5% if the slip amount of the engine speed and the turbine speed is −50 RPM, and determines the duty slope as −3% if the slip amount of the engine speed and the turbine speed is −100 RPM.

The duty offset for the damper clutch release control based on the engine torque, and the duty slop for the damper clutch release control based on slip amount of the engine speed are stored in the map data.

Then the control portion 200 initiates release control of the damper clutch 400 according to the determined duty offset by controlling the actuator at the step S205. And if the duty offset control is completed at the step S206, then the control portion 200 conducts release control of the damper clutch 400 according to the determined duty slope S1 at the step S207.

According to the damper clutch control method according to the second exemplary embodiment of the present invention may reduce shock during releasing control of the damper clutch.

Figure 6:
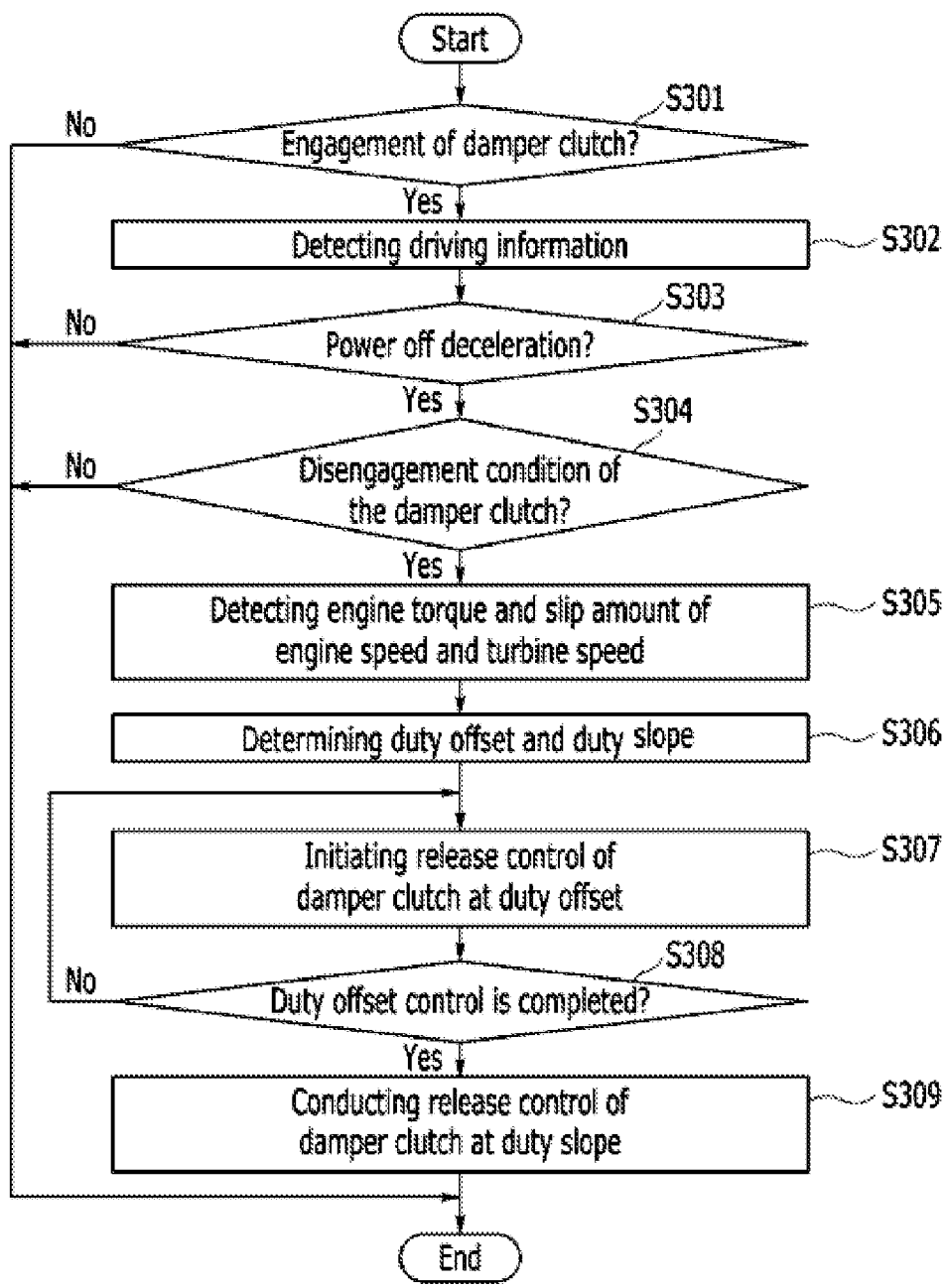
FIG. 6 is a flowchart of a damper clutch control method according to the various exemplary embodiments of the present invention.
Figure 7:
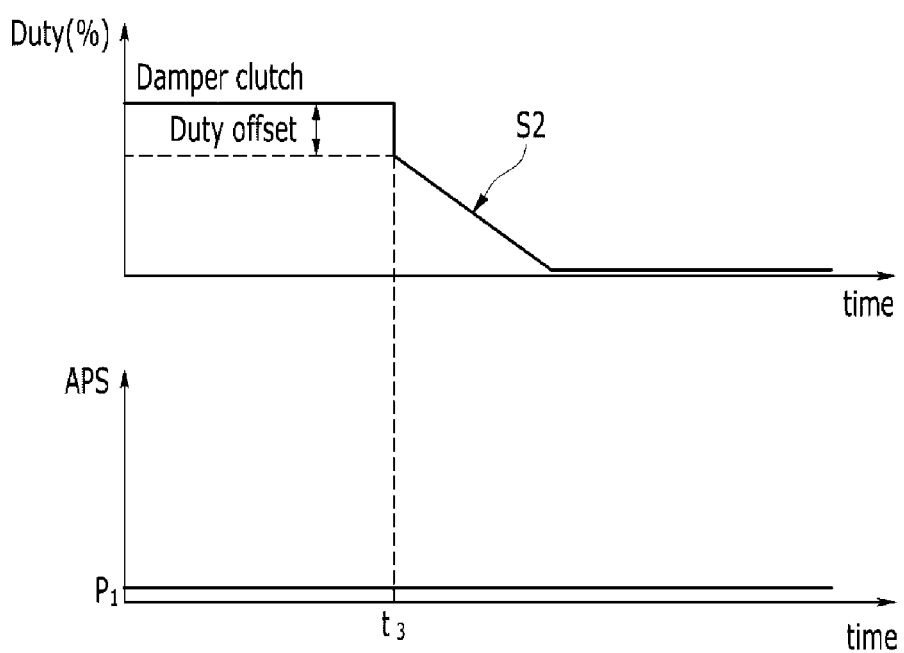
FIG. 7 is a graph showing a control relationship of a damper clutch control method according to the various exemplary embodiments of the present invention.

FIG. 6 is a flowchart of a damper clutch control method according to the third exemplary embodiment of the present invention, and FIG. 7 is a graph showing a control relationship of a damper clutch control method according to the third exemplary embodiment of the present invention.

Referring to FIG. 6 and FIG. 7, if it is in driving at a state of engagement of the damper clutch 400 at the step S301, the control portion 200 receives the driving information from the driving information detection unit 100 at the step S302, and determines whether driving condition is in power off deceleration at the step S303.

If the driving condition is in power off deceleration at the step S303, the control portion 200 determines whether driving condition is changed to disengagement condition of the damper clutch 400 according to the map data at the step S304.

If the driving condition is changed to disengagement condition of the damper clutch 400 according to the map data at the step S304, the control portion 200 detects the engine torque and the slip amount of the engine speed and the turbine speed at the step S305.

Then the control portion 200 determines the duty offset for the damper clutch release control based on the engine torque, and the duty slope S2 for the damper clutch release control based on slip amount of the engine speed and the turbine speed at the step S306.

For example, the control portion 200 determines the duty offset as 20% for the damper clutch release control if the engine torque is 50 Nm, and determines the duty offset as 30% if the engine torque is 100 Nm. Also, the control portion 200 determines the duty slope as −5% if the slip amount of the engine speed and the turbine speed is −50 RPM, and determines the duty slope as −3% if the slip amount of the engine speed and the turbine speed is −100 RPM.

The duty offset for the damper clutch release control based on the engine torque, and the duty slope for the damper clutch release control based on slip amount of the engine speed are stored in the map data.

Then the control portion 200 initiates release control of the damper clutch 400 according to the determined duty offset by controlling the actuator at the step S307. And if the duty offset control is completed at the step S308, then the control portion 200 conducts release control of the damper clutch 400 according to the determined duty slope S1 at the step S309.

According to the damper clutch control method according to the third exemplary embodiment of the present invention may reduce shock during releasing control of the damper clutch.

Figure 8:
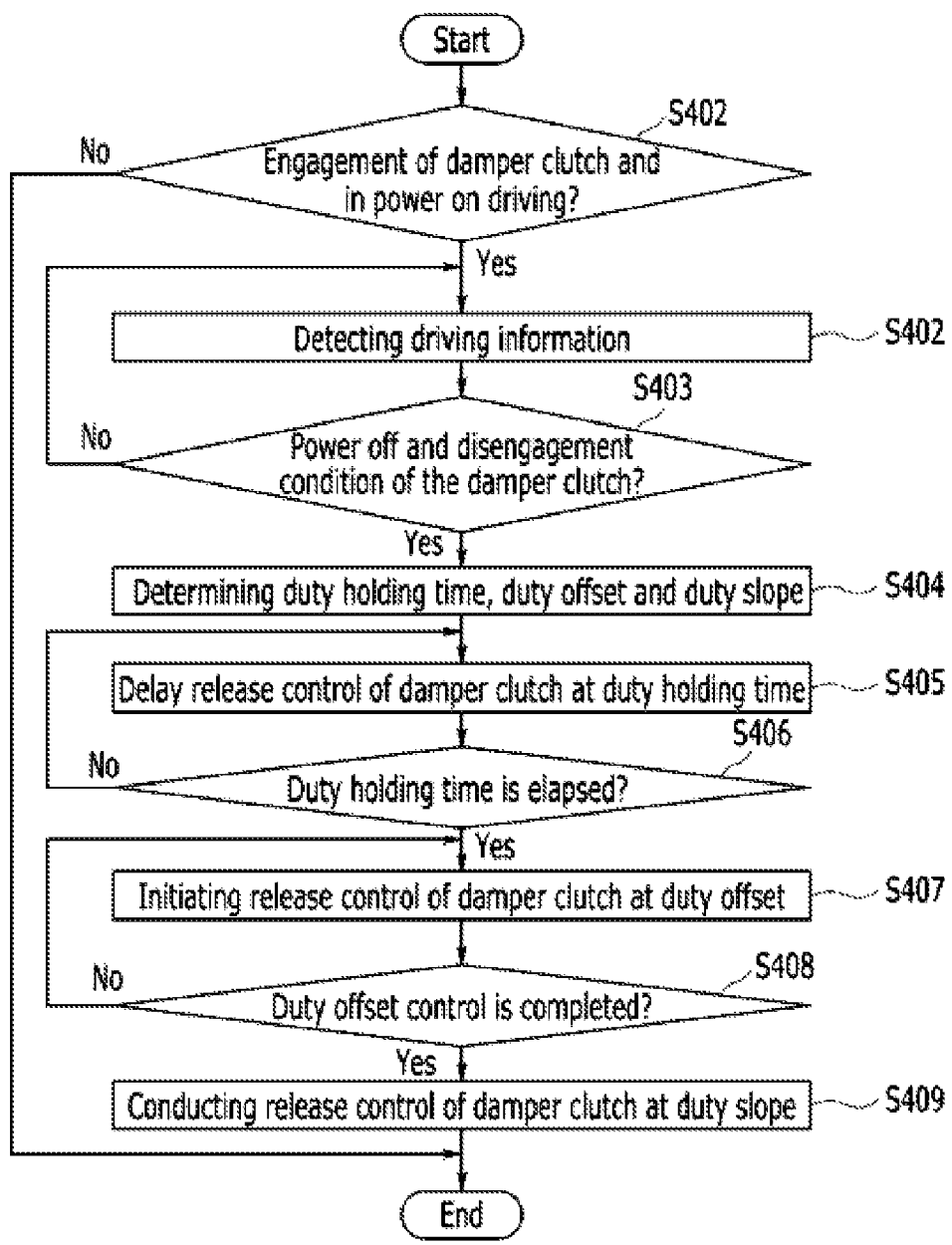
FIG. 8 is a flowchart of a damper clutch control method according to the various exemplary embodiments of the present invention.
Figure 9:
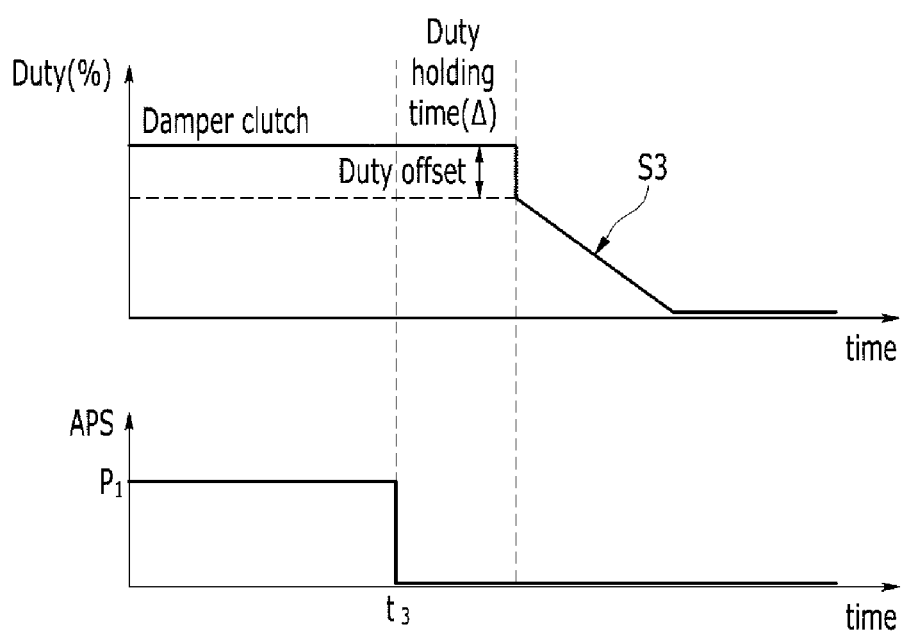
FIG. 9 is a graph showing a control relationship of a damper clutch control method according to the various exemplary embodiments of the present invention.

FIG. 8 is a flowchart of a damper clutch control method according to the fourth exemplary embodiment of the present invention, and FIG. 9 is a graph showing a control relationship of a damper clutch control method according to the fourth exemplary embodiment of the present invention.

Referring to FIG. 8 and FIG. 9, if it is in driving at a state of engagement of the damper clutch 400 and in power on driving at the step S401, the control portion 200 receives the driving information from the driving information detection unit 100 at the step S402, and determines whether the power off (of which a driver take foot off the accelerator pedal) is detected at the step 403.

The control portion 200 determines that it is the power off (driver's intention of deceleration) if the displacement amount of an accelerator pedal is detected lower than 1%, or the turbine speed change is less than −2500 RPM/sec.

If the power off is detected at the step 403, the control portion 200 determines the duty offset for the damper clutch release control, the duty slope for the damper clutch release control, and the duty holding time for the damper clutch release control at the step S404.

The control portion 200 determines the duty offset based on the engine torque, the duty slope based on slip amount of the engine speed and the turbine speed, and the duty holding time based on slip amount of the engine speed and the turbine speed.

For example, if the slip amount of the engine speed and the turbine speed is 0 RPM, the duty holding time is set as "0" sec, and if the slip amount is −50 RPM, the duty holding time is set as 0.5 sec.

The duty offset for the damper clutch release control based on the engine torque, the duty slope for the damper clutch release control based on slip amount of the engine speed and the turbine speed, and the duty holding time for the damper clutch release control based on slip amount of the engine speed and the turbine speed are stored in the map data.

The control portion 200 holds current duty at a predetermined interval during the duty holding time determined at the step S404 so as to delay the release control of the damper clutch 400 at the step S405, and then if the duty holding time is elapsed at the step S406, the control portion 200 initiates the release control of the damper clutch 400 according to the determined duty offset at the step S407.

And if the duty offset control is completed at the step S408, then the control portion 200 conducts the release control of the damper clutch 400 according to the determined duty slope S3 at the step S409.

According to the damper clutch control method according to the fourth exemplary embodiment of the present invention may reduce shock during releasing control of the damper clutch.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A damper clutch control apparatus for an automatic transmission comprising:
   a driving information detection unit detecting driving information including a displacement amount of an accelerator pedal, an engine speed, an engine torque, and a rotation speed of a turbine;
   a control portion which receives the driving information and realize a release control of a damper clutch when a driver's intention for acceleration or deceleration of a vehicle is detected in a state of engagement of the damper clutch; and
   an actuator which controls hydraulic pressure supplied to the damper clutch so as to realize connection or release of the damper clutch according to a control signal received from the control portion,
   wherein:
      the control portion determines whether driving condition is changed to disengagement condition of the damper clutch according to a map data at the state of the engagement of the damper clutch and in power on driving; and
      the control portion determines duty offset and duty slope for damper clutch release control wherein the duty offset and the duty slope are determined according to the driving information of the vehicle, and conducts release control of the damper clutch according to a first determined duty offset and a first determined duty slope when the driving condition is changed to the disengagement condition of the damper clutch,
   wherein:
      the control portion determines whether the driving condition is changed to disengagement condition of the damper clutch according to the map data at the state of the engagement of the damper clutch and in power off driving; and
      the control portion determines the duty offset and the duty slope for the damper clutch release control and conducts release control of the damper clutch according to a second determined duty offset and a second determined duty slope when the driving condition is changed to the disengagement condition of the damper clutch, and wherein:
      when the control portion detects power off at the state of the engagement of the damper clutch and in power on driving, the control portion determines a duty holding time, the duty offset and the duty slope for the damper clutch release control and conducts release control of the damper clutch according to a determined duty holding time, a third determined duty offset and a third determined duty slope.

2. The damper clutch control apparatus of claim 1, wherein the driving information detection unit includes:
   an accelerator pedal position detector detecting a position of the accelerator pedal and supplying corresponding signal to the control portion;
   an engine speed detector detecting the engine speed and supplying corresponding signal to the control portion;
   an engine torque detector detecting the engine torque and supplying corresponding signal to the control portion; and
   a turbine rotation speed detector detecting the rotation speed of the turbine and supplying corresponding signal to the control portion.

3. The damper clutch control apparatus of claim 1, wherein:
   the control portion determines that there is a driver's intention of acceleration when the displacement amount of the accelerator pedal is changed over 20%, or the accelerator pedal changing rate is 100%/sec at the state of the engagement of the damper clutch and in power on driving; and the control portion conducts the release control of the damper clutch.

4. The damper clutch control apparatus of claim 1, wherein:

the control portion determines the duty offset for the damper clutch release control based on the engine torque; and the control portion determines the duty slope for the damper clutch release control based on a slip amount of the engine speed and the turbine speed.

5. The damper clutch control apparatus of claim 4, wherein the control portion is provided with a predetermined map data including the duty offset for the damper clutch release control based on the engine torque, and the duty slope for the damper clutch release control based on the slip amount of the engine speed and the turbine speed.

6. The damper clutch control apparatus of claim 4, wherein the control portion determines the duty holding time for the damper clutch release control based on the slip amount of the engine speed and the turbine speed.

7. The damper clutch control apparatus of claim 5, wherein the control portion is provided with the predetermined map data including the duty offset for the damper clutch release control based on the engine torque, the duty slope for the damper clutch release control based on the slip amount of the engine speed and the turbine speed, and the duty holding time for the damper clutch release control based on the slip amount of the engine speed and the turbine speed.

8. The damper clutch control apparatus of claim 1, wherein the control portion determines a driving state as power off when the displacement amount of the accelerator pedal is detected lower than 1%, or a turbine speed change is less than −2500 RPM/sec.

9. A damper clutch control method for an automatic transmission comprising:

releasing a damper clutch when a driver's intention of acceleration is detected at a state of engagement of the damper clutch and in power on driving;

determining the duty offset and the duty slope for damper clutch release control wherein the duty offset and the duty slope are determined according to the driving information of the vehicle, and conducting the release control of the damper clutch according to a first determined duty offset and a first determined duty slope when the driving condition is changed to disengagement condition of the damper clutch according to a map data at the state of the engagement of the damper clutch and in power on driving;

determining the duty offset and the duty slope for the damper clutch release control and conducting the release control of the damper clutch according to a second determined duty offset and a second determined duty slope when the driving condition is changed to disengagement condition of the damper clutch according to the map data at the state of the engagement of the damper clutch and in power off driving; and determining a duty holding time, the duty offset and the duty slope for damper clutch release control and conducting the release control of the damper clutch according to the duty holding time, a third determined duty offset and a third duty slope when power off is detected at the state of the engagement of the damper clutch and in power on driving.

10. The damper clutch control method of claim 9, wherein:

the duty offset for the damper clutch release control is determined based on an engine torque; and the duty slop for the damper clutch release control is determined based on a slip amount of an engine speed and a turbine speed.

11. The damper clutch control method of claim 10, wherein the duty holding time for the damper clutch release control is determined based on the slip amount of the engine speed and the turbine speed.

12. The damper clutch control method of claim 9, wherein when a displacement amount of an accelerator pedal is changed over 20%, or an accelerator pedal changing rate is 100%/sec at the state of the engagement of the damper clutch and in power on driving, a driver's intention of acceleration is determined to exist and the damper clutch is released.

13. The damper clutch control method of claim 9, wherein:

a driving state is determined of power off when a displacement amount of an accelerator pedal is detected lower than 1%, or a turbine speed change is less than −2500 RPM/sec, a driver's intention of deceleration is determined to exist.

* * * * *